US012674520B2

(12) United States Patent
Yamauchi et al.

(10) Patent No.: US 12,674,520 B2
(45) Date of Patent: Jul. 7, 2026

(54) VALVE UNIT

(71) Applicant: CKD CORPORATION, Aichi (JP)

(72) Inventors: Masaya Yamauchi, Aichi (JP);
Tatsushi Nabei, Aichi (JP); Kazuhiro Fujita, Aichi (JP)

(73) Assignee: CKD Corporation, Aichi (JP)

( * ) Notice: Subject to any disclaimer, the term of this patent is extended or adjusted under 35 U.S.C. 154(b) by 106 days.

(21) Appl. No.: 18/658,009

(22) Filed: May 8, 2024

(65) Prior Publication Data

US 2024/0384809 A1      Nov. 21, 2024

(30) Foreign Application Priority Data

May 15, 2023      (JP) ................................. 2023-080348

(51) Int. Cl.
*F16K 31/04*          (2006.01)
*F16K 11/085*        (2006.01)

(52) U.S. Cl.
CPC ........ *F16K 31/042* (2013.01); *F16K 11/0853* (2013.01)

(58) Field of Classification Search
CPC ............................ F16K 31/042; F16K 11/0853
See application file for complete search history.

(56) References Cited

U.S. PATENT DOCUMENTS

| | | | |
|---|---|---|---|
| 10,775,200 B2 * | 9/2020 | Okumura | G01D 5/2451 |
| 2010/0092317 A1 * | 4/2010 | Suhara | F16C 32/0429 418/48 |
| 2023/0383854 A1 | 11/2023 | Ito et al. | |

FOREIGN PATENT DOCUMENTS

JP          2022-129911 A        9/2022

* cited by examiner

*Primary Examiner* — Angelisa L. Hicks
(74) *Attorney, Agent, or Firm* — Osha Bergman Watanabe & Burton LLP

(57) ABSTRACT

A valve unit includes a rotary valve having a predetermined clearance between an inner surface of a main body and a valve element. The magnet coupling includes eight outer peripheral magnets and eight inner peripheral magnets having N-poles and S-poles each on an outer or inner peripheral side. The outer peripheral magnets are disposed such that the N-poles and the S-poles are disposed alternately in a circumferential direction and such that a distance between the central axis and an outer peripheral surface of the outer peripheral magnets is between 90% and 100% of a distance between the central axis and an outer surface of the main body closest to the central axis in a direction perpendicular to the central axis. The inner peripheral magnets are disposed opposite to the outer peripheral magnets such that the N-poles and the S-poles are disposed alternately in the circumferential direction.

8 Claims, 13 Drawing Sheets

VALVE UNIT

CROSS-REFERENCE TO RELATED APPLICATION

The present application claims priority to Japanese Patent Application No. 2023-80348 filed on May 15, 2023, the content of which is incorporated herein by reference in its entirely.

BACKGROUND

Technical Field

The present disclosure relates to a valve unit that transmits a rotational force from a drive unit to a valve element in a rotary valve via a magnet coupling.

Description of Related Art

A magnet coupling in a known valve unit includes arc-shaped outer peripheral magnets that are arranged in a circumferential direction such that magnetic poles of the outer peripheral magnets are disposed alternately. The magnet coupling further includes arc-shaped inner peripheral magnets that are arranged in the circumferential direction and opposite the outer peripheral magnets such that magnetic poles of the inner peripheral magnets are disposed alternately. The number of the inner peripheral magnets is equal to the number of the outer peripheral magnets. An example of such a magnet coupling is disclosed in Japanese Patent Application Laid-Open No. 2022-129911.

In the valve unit disclosed in Japanese Patent Application Laid-Open No. 2022-129911, a valve element is disposed inside a valve chamber that is a cylindrical space formed in a valve element such that the valve element is rotatable about the central axis of the valve chamber. An inner surface of a valve main body defines the valve chamber. A predetermined clearance is provided between the inner surface of the valve main body and the valve element and thus a sliding resistance between the inner surface of the valve main body and the valve element can be significantly reduced. This may improve a rotational response and a rotational position accuracy of the valve element. However, the magnet coupling generates a repelling force with respect to a force in the rotational direction. In such a configuration, if the clearance is provided, the valve element at a certain rotational position may receive a significant influence of pulsating flow of the fluid that flows into the valve chamber and thus the valve element may resonate in the rotational direction. The present disclosers have focused on such technical issues.

SUMMARY

One or more embodiments of the present disclosure reduce resonance of the valve element in the rotational direction even when a predetermined clearance is provided between the inner surface of the valve main body and the valve element in the valve unit that includes a magnet coupling that transmits a rotational force from the drive unit to the valve element in the rotary valve.

One aspect of the present disclosure provides a valve unit that includes a rotary valve, a motor, and a magnet coupling. The rotary valve includes a main body and a valve element. The main body comprises a cylindrical valve chamber. The valve element is housed in the valve chamber and rotatable about a central axis of the valve chamber, a flow of a fluid that flows into the valve chamber being controlled according to a rotational position(s) of the valve element. The motor includes a rotary shaft that rotates and is held at a predetermined rotary position(s). The motor rotates the rotary shaft and holds the rotary shaft at the rotary position(s). The magnet coupling transmits a torque between the rotary shaft and the valve element. The rotary valve has a predetermined clearance between an inner surface of the main body and the valve element. The magnet coupling includes eight outer peripheral magnets having N-poles and S-poles, each of the N-poles and S-poles being disposed on an outer peripheral side or an inner peripheral side. The magnet coupling further includes eight inner peripheral magnets having N-poles and S-poles, each of N-poles and S-poles being disposed on an outer peripheral side or an inner peripheral side. The outer peripheral magnets are disposed in a circle about the central axis such that the N-poles and the S-poles are disposed alternately in a circumferential direction. A distance between the central axis and an outer peripheral surface of the outer peripheral magnets is in a range from 90% to 100% (i.e., between 90% and 100%) of a distance between the central axis and an outer surface of the main body closest to the central axis in a direction perpendicular to the central axis. The inner peripheral magnets are disposed in a circle about the central axis and opposite to the outer peripheral magnets such that the N-poles and the S-poles are disposed alternately in the circumferential direction.

By rotating the valve element and changing the rotational position of the valve element, the flow of the fluid that entering the valve chamber can be controlled. By rotating the rotary axis of the motor and holding the rotary axis at an appropriate rotational position (i.e., an appropriate rotational position of the valve element), the flow of the fluid that enters the valve chamber can be maintained at an appropriate rate.

Because of the clearance, a sliding resistance between the inner surface of the main body and the valve element can be significantly reduced. Therefore, the rotational response and the rotational position accuracy of the valve element improve. However, the magnet coupling generates a repelling force with respect to the force in the rotational direction. When the valve element is at a certain rotational position, influences of pulsation or cavitation of the fluid that enters the valve chamber may be significant. This may cause resonance of the valve element in the rotational direction.

According to the configuration, in comparison to a magnet coupling that includes four outer peripheral magnets and four inner peripheral magnets, an increase in repelling force with respect to a displacement between the inner peripheral magnets and the outer peripheral magnets in the rotational direction can be increased at the rising edge, and the maximum magnitude of the repelling force can be increased. This has been confirmed through simulations. In a configuration that includes a magnet coupling that includes twelve outer peripheral magnets and twelve inner peripheral magnets, the increase in repelling force with respect to the displacement between the inner peripheral magnets and the outer peripheral magnets in the rotational direction can be increased at the rising edge; however, the maximum magnitude of the repelling force is small in comparison to the magnet coupling that includes four outer peripheral magnets and four inner peripheral magnets. This has been confirmed through simulations.

The greater the distance between the central axis and the outer peripheral surface of the outer peripheral magnets is, the greater the increase in repelling force with respect to the displacement between the inner peripheral magnets and the outer peripheral magnets in the rotational direction and the maximum magnitude of the repelling force are. This has been confirmed through the simulations. In comparison to the configuration in which the distance between the central axis and the outer peripheral surface of the eight outer peripheral magnets is less than 90% of the distance between the central axis and the closest outer surface of the main body with respect to the central axis in the direction perpendicular to the central axis, the magnetic force that acts on the inner peripheral magnets from the outer peripheral magnets can be increased.

According to the configuration described above, the repelling force generated by the magnet coupling can be increased and thus the natural frequency of the magnet coupling can be increased greater than the frequency of the pulsation of the fluid. Even in the configuration that has the predetermined clearance between the inner surface of the main body and the valve element, which may reduce the sealing performance to keep the fluid inside, the resonance of the valve element in the rotational direction can be reduced. Further, the distance between the central axis and the outer peripheral surface of the eight outer peripheral magnets is 100% or less of the distance between the central axis and the closest outer surface of the main body to the central axis in the direction perpendicular to the central axis. Therefore, the outer peripheral surface of the outer peripheral magnets is less likely to protrude outward farther than the outer surface of the main body with respect to the central axis of the valve chamber.

In a second aspect, the outer surface of the outer peripheral magnets closest to the outer surface of the main body may be at a position within 5 mm apart from the outer surface of the main body closest to the central axis. According to the configuration, the outer peripheral surface of the outer peripheral magnets is less likely to protrude outward farther than the outer surface of the main body with respect to the central axis of the valve chamber, and the magnetic force that acts on the inner peripheral magnets from the outer peripheral magnet can be increased as much as possible.

In a third aspect, the main body may have a regular quadrangular prism shape that may extend in an extending direction of the central axis, and the distance between the central axis and the outer surface of the main body closest to the central axis may be 30 mm. The cross section of the main body of the rotary valve (a cross section that is perpendicular to the central axis of the valve chamber) may be in a square shape. The length of each side of the main body may be 60 mm. According to the configuration that includes the main body of the rotary valve formed in a 60 millimeter square quadrangular prism shape, which is a general shape in a general size, and the resonance of the valve element in the rotational direction can be reduced.

In a fourth aspect, a distance between the central axis and the outer peripheral surface of each of the outer peripheral magnets may be 27.5 mm. That is, an outer diameter of a cylindrical magnet defined by eight outer peripheral magnets that are arranged in the circumferential direction may be 55 mm. According to the configuration, the outer diameter (55 mm) of the cylindrical magnet defined by eight outer peripheral magnets may be 91.67% of a width (60 mm) of the regular quadrangular prism-shaped main body.

In a fifth aspect, a thickness of the outer peripheral magnets and a thickness of the inner peripheral magnets measured in a radial direction may be 3 mm. According to the configuration, the thicknesses of the outer peripheral magnets and the inner peripheral magnets measuring in the radial direction are less likely to be greater than necessary.

In a sixth aspect, the fluid may be a liquid. In the valve unit that receives influence of cavitation in which the liquid is vaporized due to a low pressure and bubbles are generated, that is, in which resonance of the valve element is more likely to occur, the resonance of the valve element in the rotation direction can be reduced.

DETAILED DESCRIPTION OF EMBODIMENTS

Embodiment that include a temperature control system for controlling a temperature of a workpiece support (a control target) in a processing apparatus will be described with reference to the drawings.

Figure 1:
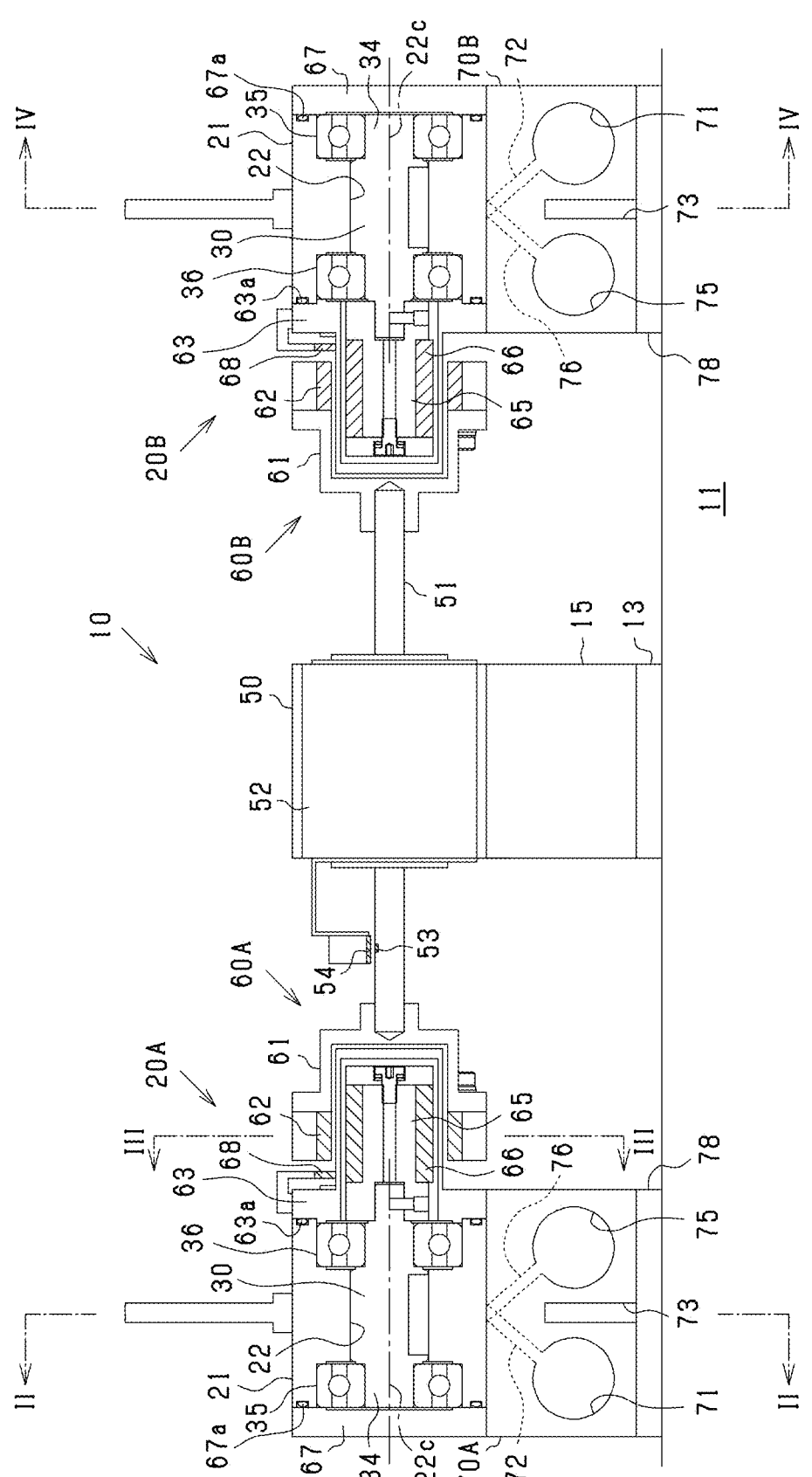
FIG. 1 is a partial cross-sectional view of a valve unit.

FIG. 1 illustrates a cross section of one of valve units in the temperature control system. A valve unit 10 includes a first four-way valve 20A, a second four-way valve 20B, a motor 50, a first magnet coupling 60A, and a second magnet coupling 60B.

The motor 50 (a drive unit) is supported by the support plate 11 (a support member) via a block 15 (a spacer) and a heat insulator 13. The motor 50 may be a servo motor or a stepping motor. The motor 50 includes a motor body 52 and a rotary shaft 51 that protrudes from either side of the motor body 52. The motor 50 is capable of rotating the rotary shaft 51 and holding the rotary shaft 51 at rotation positions. A magnet 53 is attached to an outer peripheral edge portion of the rotary shaft 51 at a predetermined position. A magnetic sensor 54 is attached to the motor 50 to detect a magnetic field produced by the magnet 53 when the magnet 53 that rotates with the rotary shaft 51 comes to the origin (a reference rotation position). That is, the magnetic sensor 54 detects the origin of the motor 50 (the rotary shaft 51). The motor 50 is controlled by a control unit 80 (see FIG. 5). Detection signals are input from the magnetic sensor 54 to the control unit 80. The magnet 53 may be omitted and a predetermined portion of the rotary shaft 51 may be magnetized.

The first four-way valve 20A (a rotary valve) is supported by the support plate 11 via a first flow channel block 70A and a heat insulator 78. The first four-way valve 20A includes a main body (or housing) 21, a valve element 30, and bearings 35 and 36.

The main body 21 (a valve main body) may be made of metal and formed in a rectangular parallelepiped shape (a quadrangular prism shape). The main body 21 includes a valve chamber (cylindrical valve chamber) 22 that includes a columnar space. The central axis 22c of the valve chamber 22 is aligned with the central axis of the rotary axis 51 of the motor 50. The main body 21 is formed in a regular quadrangular prism shape extending in the central axis 22c. In a cross section of the main body 21 (a cross section that is perpendicular to the central axis 22c), a width W1 (a length of one side) of the main body 21 in a square shape is 60 [mm] in one or more embodiments (see FIG. 3). The main body 21 is formed in a 60 millimeter square quadrangular prism shape, which is a general shape in a general size. Among the outer surfaces of the main body 21, a distance between the central axis 22c and the outer surface 21s is the shortest. The distance L1 between the central axis 22c and the outer surface 21s is 30 [mm]. That is, the distance L1 between the central axis 22c and the outer surface 21s measuring in a direction perpendicular to the central axis 22c of the main body 21, which is the closest, is 30 [mm].

Figure 2:
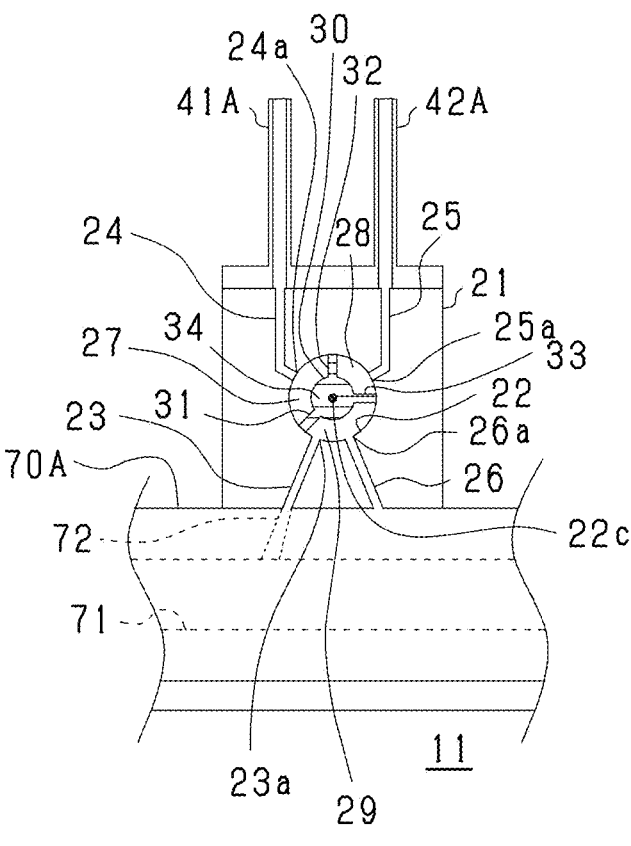
FIG. 2 is a cross-sectional view taken along line II-II in FIG. 1.

FIG. 2 illustrates a cross section taken along line II-II in FIG. 1. The main body 21 includes a first cavity 23, a second cavity 24, a third cavity 25, and a fourth cavity 26 that communicate with the valve chamber 22 at positions arranged in the clockwise direction (a predetermined rotation direction) about the central axis 22c of the valve chamber 22. The valve chamber 22 communicates with the outside of the main body 21 via the first to the fourth cavities 23 to 26. The first cavity 23, the second cavity 24, the third cavity 25, and the fourth cavity 26 communicate with the valve chamber 22 at a first position 23a, a second position 24a, a third position 25a, and a fourth position 26a, respectively. The first position 23a to the fourth position 26a are arranged in this sequence in the clockwise direction. That is, the first position 23a, the second position 24a, the third position 25a, and the fourth position 26a are arranged in sequence in the clockwise direction, which is one of the circumferential directions of the valve chamber 22.

A valve element 30 is held in the valve chamber 22. The valve element 30 is in a columnar shape that extends along the central axis 22c of the valve chamber 22. The valve element 30 includes a columnar central portion 34, a first partition portion 31, a second partition portion 32, and a third partition portion 33. The central portion 34 extends along the central axis 22c of the valve chamber 22. The first to the third partition portions 31 to 33 each have a flat plate shape that extends from the central portion 34 in the radial direction of the valve chamber 22. The central axis of the central portion 34 is aligned with the central axis 22c of the valve chamber 22. The central portion 34 is supported by bearings 35 and 36 such that the central portion 34 is rotatable in the clockwise direction and the counterclockwise direction about the central axis 22c of the valve chamber 22. The valve element 30 controls the flow of the fluid that enters the valve chamber 22 based on the rotational position.

The first partition portion 31, the second partition portion 32, and the third partition portion 33 are arranged in this sequence in the clockwise direction to partition the valve chamber 22 in the clockwise direction. The first partition portion 31, the second partition portion 32, and the inner wall of the valve chamber 22 define a first region 27. The second partition portion 32, the third partition portion 33, and the inner wall of the valve chamber 22 define a second region 28. The third partition portion 33, the first partition portion 31, and the inner wall of the valve chamber 22 define third region 29. That is, the valve element 30 partitions the valve chamber 22 into the first region 27, the second region 28, and the third region 29 that are arranged in the clockwise direction.

An angular interval between the first position 23a and the second position 24a about the central axis 22c of the valve chamber 22 is 97.5°. An angular interval between the third position 25a and the fourth position 26a about the central axis 22c of the valve chamber 22 is 97.5°. An angular interval between the second position 24a and the third position 25a about the central axis 22c of the valve chamber 22 is 120°. An angular interval between the fourth position 26a and the first position 23a about the central axis 22c of the valve chamber 22 is 45°. An angular interval between the first partition portion 31 and the second partition portion 32 about the central axis 22c of the valve chamber 22 is 135°. An angular interval between the third partition portion 33 and the first partition portion 31 about the central axis 22c of the valve chamber 22 is 135°. An angular interval between the second partition portion 32 and the third partition portion 33 about the central axis 22c of the valve chamber 22 is 90°.

That is, in the clockwise direction about the central axis 22c of the valve chamber 22, the interval (the angular interval) between the first partition portion 31 and the second partition portion 32 is greater than the interval between the first position 23a and the second position 24a, less than the interval between the first position 23a and the third position 25a, and less than the interval between the fourth position 26a and the second position 24a. In the clockwise direction about the central axis 22c of the valve chamber 22, the interval between the second partition portion 32 and the third partition portion 33 is less than the interval between the second position 24a and the third position 25a. In the clockwise direction about the central axis 22c of the valve chamber 22, the interval between the third partition portion 33 and the first partition portion 31 is greater than the interval between the third position 25a and the fourth position 26a, greater than the interval between the fourth position 26a and the first position 23a, less than the interval between the third position 25a and the first position 23a, and less than the interval between the second position 24a and the fourth position 26a.

Figure 3:
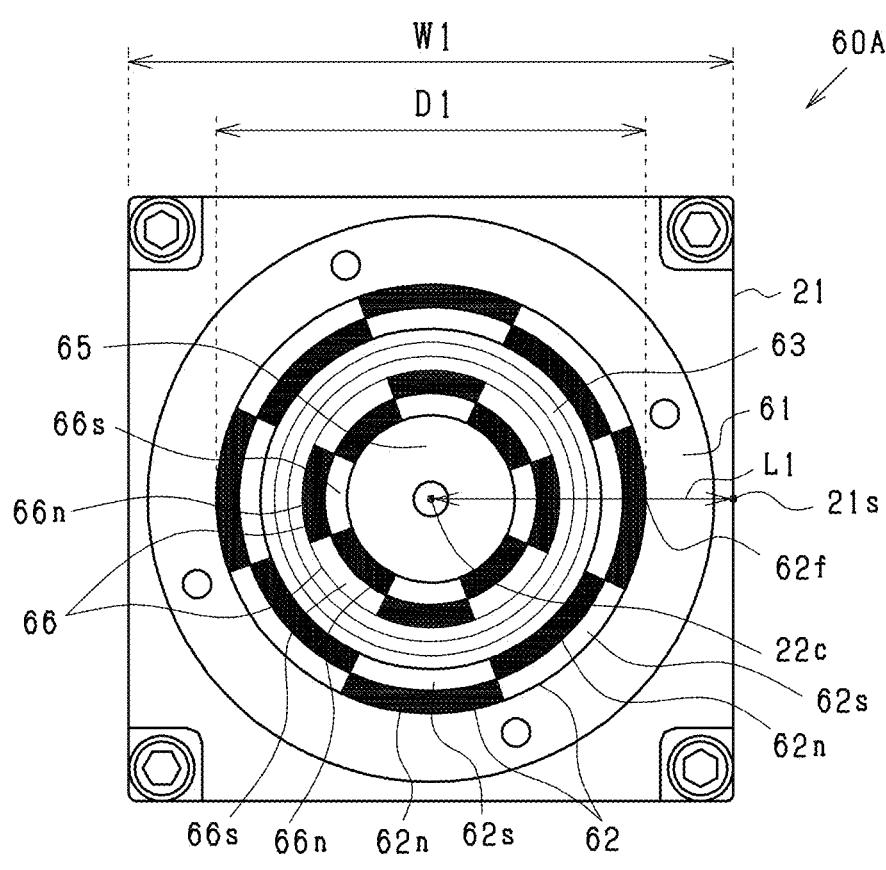
FIG. 3 is a cross-sectional view taken along line III-III in FIG. 1.

One end of the rotary shaft 51 of the motor 50 is connected to the valve element 30 in the first four-way valve 20A via a first magnet coupling 60A. That is, the first magnet coupling 60A (the magnet coupling) transmits a rotational force (a torque) between the rotary shaft 51 and the valve element 30. As illustrated in FIG. 3, the first magnet coupling 60A includes the outer peripheral member 61, eight outer peripheral magnets 62, the inner peripheral member 65, and eight inner peripheral magnets 66.

The outer peripheral member 61 is in a cylindrical shape with a closed bottom and is connected to the rotary shaft 51. The outer peripheral member 61 rotates with the rotary shaft 51 about the central axis of the rotary shaft 51 (the central axis 22c of the valve chamber 22).

Eight (a plurality of) outer peripheral magnets 62 are attached to an edge portion of the inner periphery of the outer peripheral member 61. The outer peripheral magnets 62 form arcs of a circle around the central axis 22c. The outer peripheral magnets 62 include N-poles 62n and S-poles 62s on the outer peripheral side and the inner peripheral side. In one or more embodiments, the thickness of eight outer peripheral magnets 62 in a radial direction is 3 [mm]. Eight outer peripheral magnets 62 are arranged such that the magnetic poles are disposed alternately in the circumferential direction of the outer peripheral member 61.

The outer diameter D1 of the cylindrical magnet composed of eight outer peripheral magnets 62 that are arranged in the circumferential direction (hereinafter, may be referred to as "the outer diameter of the outer peripheral magnets") is 55 [mm] in one or more embodiments. That is, a distance between the central axis 22c of the valve chamber 22 and the outer peripheral surface of each outer peripheral magnet 62 is 27.5 [mm] (55 [mm]/2). The outer diameter D1=55 [mm] of the cylindrical magnet composed of eight outer peripheral magnets 62 is 91.67[%] of the width W1=60 [mm] of the main body 21 in a form of the regular quadrangular prism. The distance=27.5 [mm] between the central axis 22c and the outer peripheral surface of each outer peripheral magnet 62 is 91.67[%] of the distance L1=30 [mm] between the central axis 22c and a closest portion of the outer surface 21s of the main body 21 in a direction perpendicular to the central axis line 22c. That is, the distance between the central axis 22c and the outer peripheral surface of each outer peripheral magnets 62 is not less than 90[%] and not more than 100[%] of the distance L1 between the central axis 22c and the closest portion of the outer surface 21s of the main body 21.

Further, the shortest distance between the outer surface 21s of the main body 21 and the outer peripheral surface of one of eight outer peripheral magnets 62 is 2.5 [mm]. The outer peripheral surface 62f of the outer peripheral magnet 62 that is the closest to the outer surface 21s of the main body 21 that is the closest to the central axis 22c is at a position 2.5 [mm] apart from one of the outer surfaces 21s of the main body 21 inward. The outer peripheral surface 62f of the outer peripheral magnet 62 that is the closest to the outer surface 21s of the main body 21 that is the closest to the central axis 22c is at a position within 5 [mm] apart from the outer surface 21s of the main body 21 that is the closest to the central axis 22c.

The inner peripheral member 65 is formed in a columnar shape and is connected to the valve element 30. The inner peripheral member 65 rotates with the valve element 30 about a central axis (the central axis 22c of the valve chamber 22) of the central portion 34 of the valve element 30. The number (eight) of the inner peripheral magnets 66 equal to the number of the outer peripheral magnets 62 are attached to an edge portion of the outer periphery of the inner peripheral member 65. The inner peripheral magnets 66 form arcs of a circle around the central axis 22c. The inner peripheral magnets 66 include N-poles 66n and S-poles 66s on the outer peripheral side and the inner peripheral side. In one or more embodiments, eight inner peripheral magnets 66 have a thickness of 3 [mm] in the radial direction. Eight inner peripheral magnets 66 are arranged such that the magnetic poles are disposed alternately in the circumferential direction of the outer peripheral member 61 (the inner peripheral member 65).

Eight outer peripheral magnets 62 are opposite eight inner peripheral magnets 66, respectively, via the magnetic permeable portion 63 of the main body 21 of the first four-way valve 20A. A gap is provided between eight outer peripheral magnets 62 and the magnetic permeable portion 63, that is, eight outer peripheral magnets 62 are not in contact with the magnetic permeable portion 63. The magnetic permeable portion 63 is made of a non-magnetic material and has magnetic permeability. Eight outer peripheral magnets 62 and eight inner peripheral magnets 66 are attracted to each other and thus the outer peripheral member 61 and the inner peripheral member 65 are coupled to each other such that the torque is transferable between them with the magnetic force. That is, the first magnet coupling 60A transmits the torque (the rotational force) between the valve element 30 in the first four-way valve 20A and the motor 50 without contact.

When the torque is not applied to the outer peripheral member 61 and the inner peripheral member 65, as illustrated in FIG. 3, the S-poles 66s of the inner peripheral magnets 66 are opposite the N-poles 62n of the outer peripheral magnets 62, respectively, and the N-poles 66n of the inner peripheral magnets 66 are opposite the S-poles 62s of the outer peripheral magnets 62, respectively. When the outer peripheral magnets 62 and the inner peripheral magnets 66 are moved from the positions described above and are displaced from each other in the rotational direction, the first magnet coupling 60A generates a repelling force in the rotational direction (the circumferential direction). The repelling force generated by the first magnet coupling 60A sinusoidally (periodically) varies in accordance with displacement in angle between the outer peripheral magnets 62 and the inner peripheral magnets 66. The greater the number of the outer peripheral magnets 62 and the number of the inner peripheral magnets 66 are, the shorter the cycle of the repelling force is. The direction of the repelling force periodically alternates between a positive direction and a negative direction.

As illustrated in FIG. 1, a magnetic sensor 68 is attached to the first four-way valve 20A to detect magnetic fields of the inner peripheral magnets 66 that rotate with the inner peripheral member 65. That is, the magnetic sensor 68 detects rotation angles (rotation positions) of the inner peripheral member 65, or the valve element 30. Detection signals from the magnetic sensor 68 are input to the control unit 80.

A space between the main body 21 of the first four-way valve 20A and the magnetic permeable portion 63 is sealed by a sealing member 63a. A space between the main body 21 of the first four-way valve 20A and a cover 67 is sealed by a sealing member 67a. Thus, an inner space defined by the main body 21, the magnetic permeable portion 63, and the cover 67 is sealed except for the first cavity 23, the second cavity 24, the third cavity 25, and the fourth cavity 26. The sealing members 63a and 67a are not in contact with rotating members such as the valve element 30, the inner peripheral member 65, and the inner peripheral magnets 66. That is, the sealing members 63a and 67a do not rub against other members.

A first flow channel block 70A is made of a metallic material and formed in a rectangular parallelepiped shape (a quadrangular prism shape). The longitudinal direction of the first flow channel block 70A is parallel to a horizontal direction and perpendicular to the rotary axis 51 of the motor 50. The first flow channel block 70A includes a main forward channel 71 that extends in the longitudinal direction of the first flow channel block 70A. The main forward channel 71 is a columnar space formed in the first flow channel block 70A. Further, the first flow channel block 70A includes a main return channel 75 that extends in the longitudinal direction of the first flow channel block 70A.

The main return channel 75 is a columnar space formed in the first flow channel block 70A. The main forward channel 71 and the main return channel 75 are parallel to each other. The first flow channel block 70A includes a trench 73 between the main forward channel 71 and the main return channel 75. With the trench 73, heat of the fluid that flows through the main forward channel 71 and heat of the fluid that flows through the main return channel 75 are less likely to be transferred through the first flow channel block 70A. The first flow channel block 70A includes a channel 72 that connects the main forward channel 71 to the first cavity 23 of the first four-way valve 20A. Further, the first flow channel block 70A includes a channel 76 that connects the main return channel 75 to the fourth cavity 26 of the first four-way valve 20A.

Figure 4:
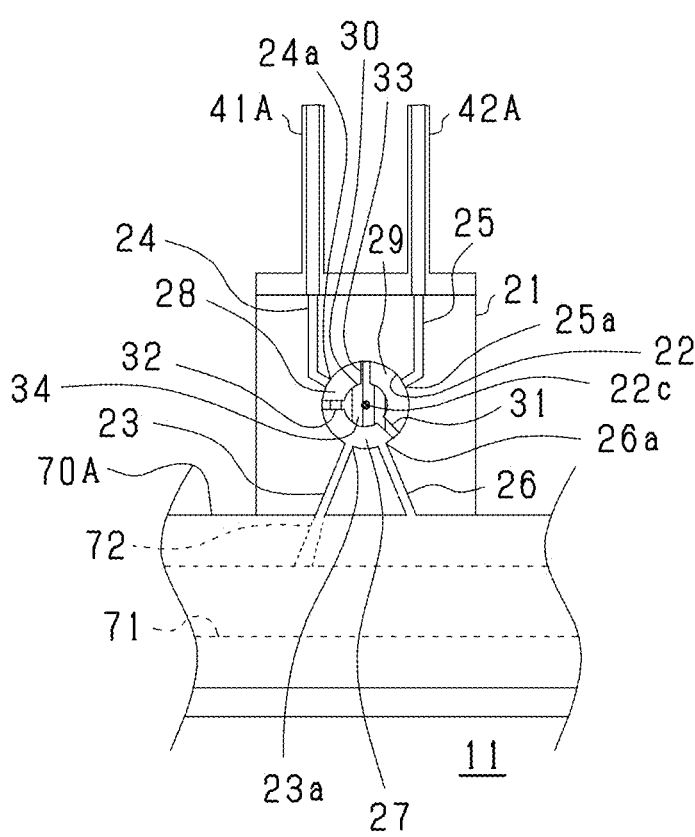
FIG. 4 is a cross-sectional view taken along line IV-IV in FIG. 1.

An end of the rotary shaft 51 of the motor 50, which is opposite from the first four-way valve 20A, is connected to the valve element 30 in the second four-way valve 20B via the second magnet coupling 60B. The second four-way valve 20B (a rotary valve) has a configuration similar to that of the first four-way valve 20A, and the second magnet coupling 60B (a magnet coupling) has a configuration similar to that of the first magnet coupling 60A. The second four-way valve 20B is supported by the support plate 11 via the second flow channel block 70B, which has a configuration similar to that of the first flow channel block 70A, and the heat insulator 78. That is, the first flow channel block 70A and the second flow channel block 70B are supported by the common support plate 11, and the heat insulator 78 is disposed between the first flow channel block 70A and the second flow channel block 70B. FIG. 4 illustrates a cross section taken along line IV-IV in FIG. 1.

The valve element 30 in the second four-way valve 20B is shifted by −90° in phase with respect to the valve element 30 in the first four-way valve 20A with the clockwise direction defined as a positive direction. The valve element 30 in the first four-way valve 20A is shifted by +90° in phase with respect to the valve element 30 in the second four-way valve 20B with the clockwise direction defined as the positive direction.

Figure 5:
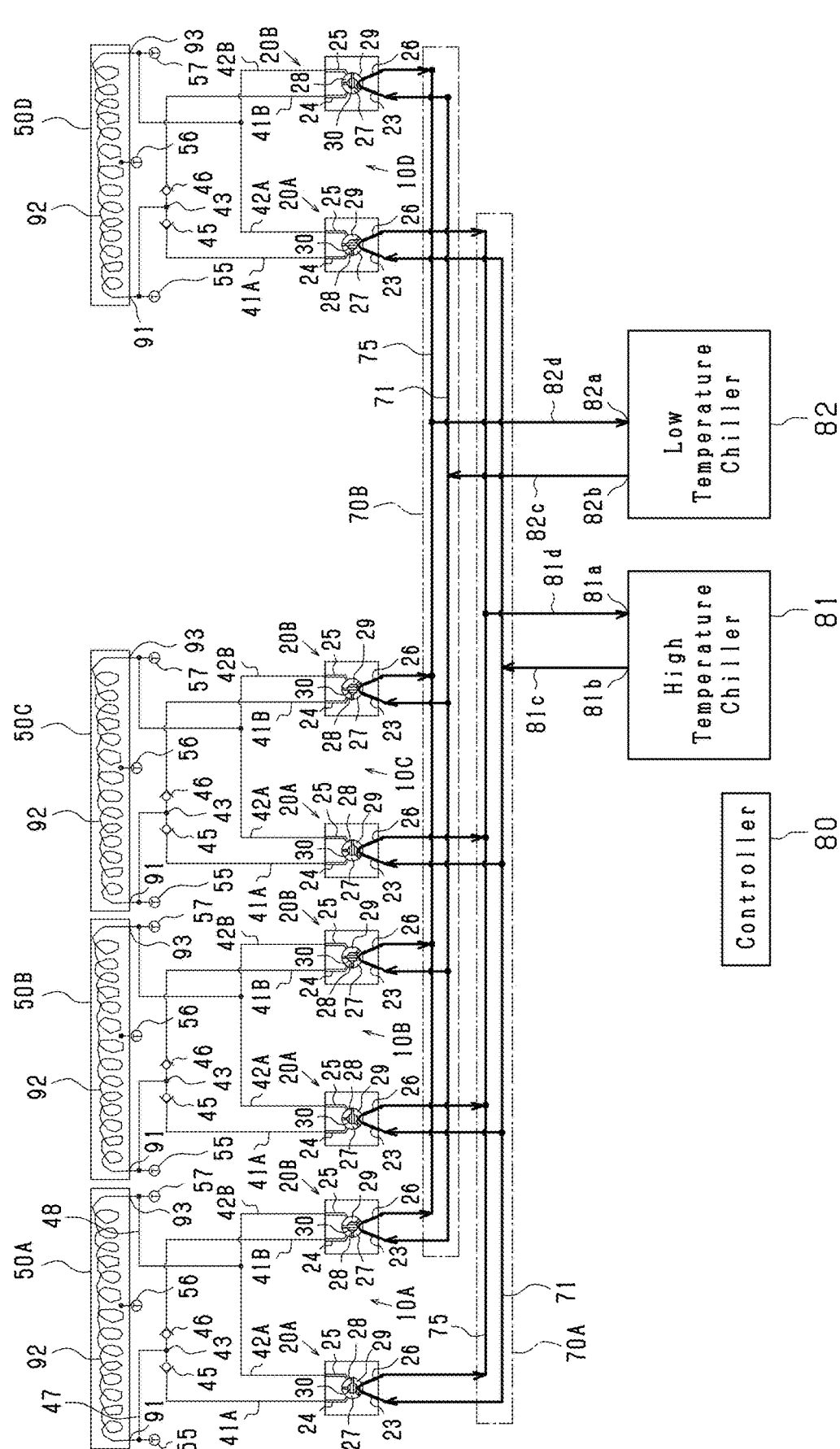
FIG. 5 is a schematic view of a temperature control system.

FIG. 5 schematically illustrates a temperature control system. The temperature control system includes the high temperature chiller 81, the low temperature chiller 82, the first flow channel block 70A, the second flow channel block 70B, the valve unit 10, and the workpiece support. The valve unit 10 includes the first valve unit 10A, a second valve unit 10B, a third valve unit 10C, and a fourth valve unit 10D. The workpiece support includes a first workpiece support 50A, a second workpiece support 50B, a third workpiece support 50C, and a fourth workpiece support 50D.

The high temperature chiller 81 (a first adjusting device) is a fluid circulation device that includes a tank, a heat exchanger, and a pump. The fluid may be a fluorine-based inert liquid. When the inert liquid is pumped by the pump of the high temperature chiller 81, pulsations may occur in the inert liquid. Further, when the inert liquid is in a low pressure state, the inert liquid may be vaporized and bubbles may be generated, that is, cavitation may occur. The high temperature chiller 81 includes a first suction port 81a and a first discharge port 81b. The fluid is sucked in through the first suction port 81a, heated to a high temperature (e.g., 180° C., a first temperature), and discharged through the first discharge port 81b. The first discharge port 81b is connected to the main forward channel 71 of the first flow channel block 70A via the channel 81c. The first suction port 81a is connected to the main return channel 75 of the first flow channel block 70A via the channel 81d. That is, the first flow channel block 70A defines at least a part of a channel between the first discharge port 81b and the first cavity 23 of each first four-way valve 20A, and at least a part of a channel between the fourth cavity 26 of each first four-way valve 20A and the first suction port 81a.

The low temperature chiller 82 (a second adjustment device) is a fluid circulation device that includes a tank, a heat exchanger, and a pump. The fluid may be a fluorine-based inert liquid. When the inert liquid is pumped by the pump in the low temperature chiller 82, pulsation of the inert liquid occurs. Further, when the inert liquid is in a low pressure state, the inert liquid may be vaporized and bubbles may be generated, that is, cavitation may occur. The low temperature chiller 82 includes a second suction port 82a and a second discharge port 82b. A fluid is sucked through the second suction port 82a, cooled down to a low temperature (e.g., 0° C., a second temperature), and discharged through the second discharge port 82b. The second discharge port 82b is connected to the main forward channel 71 of the second flow channel block 70B via the channel 82c. The second suction port 82a is connected to the main return channel 75 of the second flow channel block 70B via the channel 82d. The second flow channel block 70B is separated from the first flow channel block 70A. The second flow channel block 70B defines at least a part of a channel between the second discharge port 82b and the first cavity 23 of each second four-way valve 20B and at least a part of a channel between the fourth cavity 26 and the second suction port 82a of each second four-way valve 20B.

The second cavities 24 of the first four-way valves 20A (rotary valves) in the valve units 10A to 10D join first pipes 41A, respectively. The second cavities 24 of second four-way valves 20B (rotary valves) in the valve units 10A to 10D join second pipes 41B, respectively. The second pipes 41B are different from the first pipes 41A. In each of the valve units 10A to 10D, the first pipe 41A and the second pipe 41B join at a junction 43. First check valves 45 are disposed in the first pipes 41A, respectively. Each first check valve 45 permits the flow of fluid from the second cavity 24 of the corresponding first four-way valve 20A to the junction 43 and prohibits the flow of fluid from the junction 43 to the second cavity 24 of the corresponding first four-way valve 20A. Second check valves 46 are disposed in the second pipes 41B, respectively. Each second check valve 46 permits the flow of fluid from the second cavity 24 of the corresponding second four-way valve 20B to the junction 43 and prohibits the flow of fluid from the junction 43 to the second cavity 24 of the corresponding second four-way valve 20B.

Junctions 43 are connected to inlets 91 of the workpiece supports 50A to 50D via pipes 47, respectively. The workpiece supports 50A to 50D may include at least a part of a workpiece support table that supports the workpiece. The workpiece supports 50A to 50D include fluid channels 92 therein, respectively. The fluid flows into each flow channel 92 through the inlet 91, through the flow channel 92, and out through an outlet 93. First temperature sensors 55, second temperature sensors 56, and third temperature sensors 57 are attached to the workpiece supports 50A to 50D. Each first temperature sensor 55 detects temperature of the fluid at the corresponding inlet 91. Each second temperature sensors 56 detects temperature of the fluid at the middle of the corresponding flow channel 92. Each third temperature sensor 57 detects temperature of the fluid at the corresponding outlet 93. Detection signals of the temperature sensors 55 to 57 are input to the control unit 80.

The outlets 93 of the workpiece supports 50A to 50D are connected to pipes 48, respectively. The third cavity 25 of each first four-way valve 20A in the valve unit 10A to 10D is connected to each pipe 42A. The third cavities 25 of the second four-way valves 20B in the valve units 10A to 10D join pipes 42B, respectively. Each pipe 42A and each pipes 42B join the corresponding pipe 48.

As described above, in each of the first four-way valves 20A, the first cavity 23 joins the first discharge port 81b of the high temperature chiller 81 via the channel, the second cavity 24 joins the inlet 91 of a corresponding one of the workpiece supports 50A to 50D via the channel, the third cavity 25 joins the outlet 93 of a corresponding one of the workpiece support portions 50A to 50D via the channel, and the fourth cavity 26 joins the first suction port 81a of the high temperature chiller 81 via the channel. Further, in each of the second four-way valves 20B, the first cavity 23 joins the second discharge port 82b of the low temperature chiller 82 via the channel, the second cavity 24 joins the inlet 91 of a corresponding one of the workpiece supports 50A to 50D via the channel, the third cavity 25 joins the outlet 93 of a corresponding one of the workpiece supports 50A to 50D via the channel, and the fourth cavity 26 joins the second suction port 82a of the low temperature chiller 82 via the channel.

Figure 6:
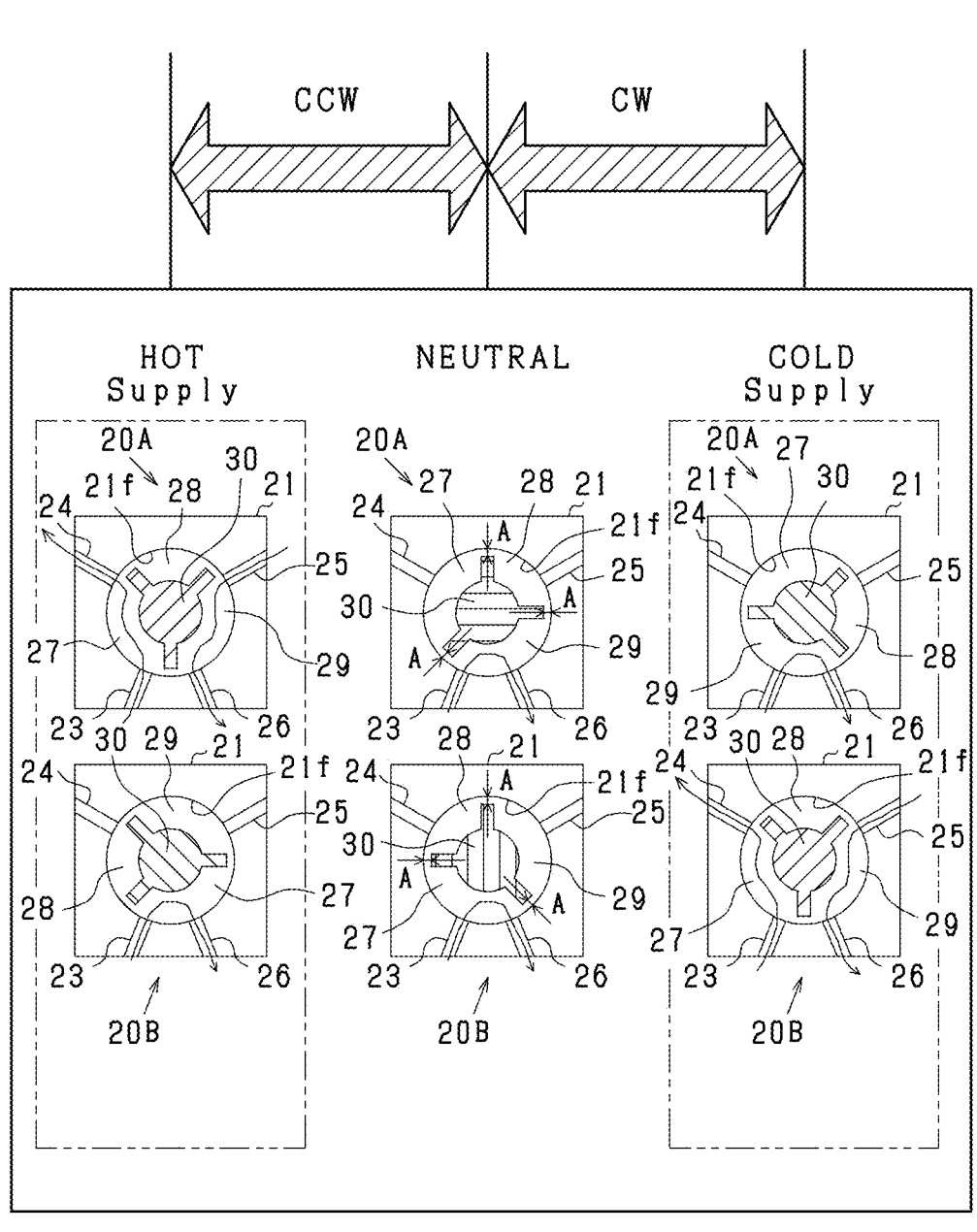
FIG. 6 is a schematic view illustrating relationship between state of a valve element and fluid supply.

FIG. 6 illustrates relation between the state of the valve elements 30 in each first four-way valve 20A and each second four-way valve 20B and fluid supply. The valve element 30 in the second four-way valve 20B is shifted by −90° in phase with respect to the valve element 30 in the first four-way valve 20A with the clockwise direction (CW: Clock Wise) defined as a positive direction. Each of the valve units 10A to 10C in FIG. 5 has the above configuration.

In NEUTRAL mode (non-circulation mode), the valve element 30 in the first four-way valve 20A communicates the second cavity 24 with the first region 27, and communicates the third cavity 25 with the second region 28, and communicates the fourth cavity 26 and the first cavity 23 with the third region 29 (second mode). Thus, as illustrated in FIG. 5, the high temperature fluid supplied from the main forward channel 71 in the first flow channel block 70A to the first cavity 23 in the first four-way valve 20A in a corresponding one of the valve units 10A to 10C is discharged to the main return channel 75 in the first flow channel block 70A via the third region 29 and the fourth cavity 26.

In NEUTRAL mode, the valve element 30 in the second four-way valve 20B communicates the second cavity 24 with the second region 28, communicates the third cavity 25 with the third region 29, and communicates the fourth cavity 26 and the first cavity 23 with the first region 27 (second condition). Thus, as illustrated in FIG. 5, the low temperature fluid supplied from the main forward channel 71 in the second flow channel block 70B to the first cavity 23 in the second four-way valve 20B in a corresponding one of the valve units 10A to 10C is discharged to the main return channel 75 in the second flow channel block 70B via the first region 27 and the fourth cavity 26.

Because each of the first four-way valve 20A and the second four-way valve 20B has a clearance A (a gap) between the inner surface 21f of the main body 21 and the valve element 30 (more specifically, a corresponding one of the partition portions 31 to 33), sealing performance to keep the fluid inside is reduced (lowered). This allows for a small leakage of the fluid through the clearance A (a decrease in the sealing performance). That is, the valve element 30 rotates while the partitions 31 to 33 (the outer surfaces of the valve element 30 closest to the inner surface 21f) of the valve element 30 do not contact the inner surface 21f of the main body 21. In FIG. 6, the clearance A is exaggeratedly illustrated; however, an actual width of the clearance A may be 10 to 40 [μm].

By turning the valve element 30 by 45° in the counter-clockwise direction (Counter Clock Wise), the valve element 30, mode is switched from NEUTRAL mode to HOT supplying mode (FIG. 6 illustrates a fully open position). In HOT supplying mode (first flow mode), the valve element 30 in the first four-way valve 20A causes the first cavity 23 and the second cavity 24 to communicate with the first region 27, and causes communication of the third cavity 25 and the fourth cavity 26 with the third region 29 (first mode). In HOT supplying mode, the valve element 30 in the second four-way valve 20B communicates the second cavity 24 with the second region 28, and communicates the third cavity 25 with the third region 29, and communicates the fourth cavity 26 and the first cavity 23 with the first region 27 (second mode). Although FIG. 6 illustrates a fully open position in HOT supplying mode, the flow rate of the hot fluid can be controlled by adjusting the rotational angle of the valve element 30 to any angle smaller than 45°.

By turning the valve element 30 by 45° in the clockwise direction, mode is switched from NEUTRAL mode to COLD supplying mode (FIG. 6 illustrates the fully open position). In COLD supplying mode (first flow mode), the valve element 30 in the first four-way valve 20A communicates the second cavity 24 with the first region 27, and communicates the third cavity 25 with the second region 28, and communicates the fourth cavity 26 and the first cavity 23 with the third region 29 (second mode). In COLD supplying mode, the valve element 30 in the second four-way valve 20B causes the first cavity 23 and the second cavity 24 to communicate with the first region 27, and causes communication of the third cavity 25 and the fourth cavity 26 with the third region 29 (first mode). Although FIG. 6 illustrates the fully open positon in COLD supplying mode, the flow rate of the low temperature fluid can be controlled by adjusting the rotational angle of the valve element 30 to any angle smaller than 45°.

The control unit 80 is a microcomputer that includes a central processing unit (CPU), a read-only memory (ROM), a random access memory (RAM), an input/output interface, and a driver. The control unit 80 controls driving of motors 50 in the valve units 10A to 10D to adjust temperatures at the intermediate positions in the flow channels 92 of the respective workpiece supports 50A to 50D to corresponding target temperatures based on the detection signals of the respective second temperature sensors 56 in the workpiece supports 50A to 50D and the detection signals of the magnetic sensors 54 and 68 (target temperature control).

Specifically, the control unit 80 may set the target temperatures at the intermediate positions in the respective flow channels 92 of the workpiece supports 50A to 50D higher than 0° C. (the second temperature) and lower than 180° C. (the first temperature) based on temperatures of surfaces of the workpiece supports 50A to 50D set by the user. The target temperatures may be set based on differences between a temperature of a front surface of one of the workpiece supports 50A to 50D and a temperature at the intermediate position of the flow channels 92 of a corresponding one of the workpiece supports 50A to 50D.

The control unit 80 controls the motors 50 in the valve units 10A to 10D to adjust the rotation angles (the rotation positions) of the valve elements 30 to switch mode to HOT supply mode (first flow mode) when the temperatures (the temperatures of the workpiece supports 50A to 50D) detected by the second temperature sensors 56 in the workpiece supports 50A to 50D are higher than 0° C., lower than the target temperatures, and lower than 180° C. Further, when the respective temperatures detected by the respective second temperature sensors 56 are higher than 0° C. and higher than the target temperature and lower than 180° C., the control unit 80 controls the rotational angle (rotational position) of the respective valve elements 30 by the respective motors 50 of the valve unit 10A to 10D to switch to COLD supplying mode (second circulating mode). Then, when the temperatures detected by the respective second temperature sensors 56 are higher than 0° C. and lower than 180° C. and in a predetermined temperature range that includes the target temperatures, the control unit 80 controls the motors 50 in the valve units 10A to 10D to rotate the respective valve elements 30 to switch to NEUTRAL mode (non-circulation mode) with priority over HOT supplying mode and COLD supplying mode. The predetermined temperature range may be within ±5° C. of the target temperature or within which temperatures detected by the second temperature sensors 56 can be determined as substantially equal to the target temperatures.

As described above, because each of the first four-way valve 20A and the second four-way valve 20B has the clearance A (the gap) between the inner surface 21f of the main body 21 and the valve element 30, the sealing performance to keep the fluid inside is reduced. Therefore, the sliding resistance between the inner surface 21f of the main body 21 and the valve element 30 can be significantly reduced, and the rotational response and the rotational position accuracy of the valve element 30 improve. When the sliding resistance between the inner surface 21f of the main body 21 and the valve element 30 is reduced, vibrations of the valve element 30 due to the rotational force is less likely to be damped. Further, the magnet couplings 60A and 60B generate repelling forces in the rotational force. At a certain rotational position at which the valve element 30 is held, influences of pulsation or cavitation of the fluid that flows into the valve chamber 22 may be significant. This may cause resonance of the valve element 30 in the rotational direction.

Figure 7:
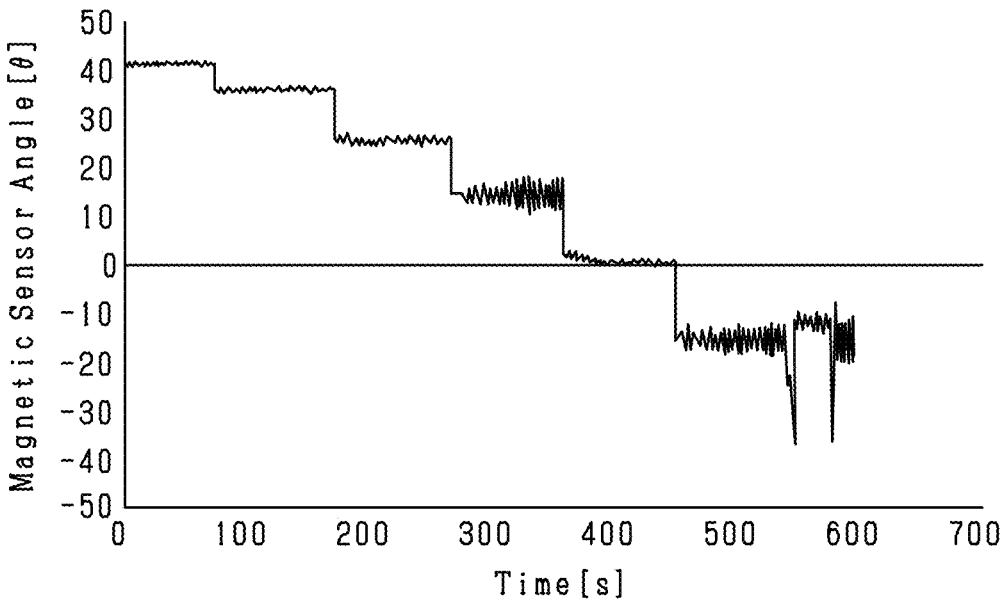
FIG. 7 is a time chart illustrating control state of a valve unit of a comparative example.

FIG. 7 illustrates control of a valve unit in a comparative example. The figure illustrates rotation angles of the valve element 30 detected by the magnetic sensor 68 when the valve element 30 is turned and held such that the rotation angle of the valve element 30 varies stepwise. A magnet coupling in the valve unit of the comparative example (hereinafter, referred to as "the magnet coupling of the comparative example") includes four outer peripheral magnets and four inner peripheral magnets. An outer diameter (an outer diameter defined by the outer peripheral magnets) of a cylindrical magnet composed of the four outer peripheral magnets arranged in the circumferential direction is 47 [mm]. The magnet coupling includes inner peripheral magnets that define an outer diameter in accordance with the outer diameter defined by the outer peripheral magnets. That is, a distance between the central axis 22c of the valve chamber 22 to an outer peripheral surface of the outer peripheral magnets is 23.5 [mm]. Other configurations of the magnet coupling in comparative embodiments are similar to those of the first magnet coupling 60A. Therefore, in the magnet coupling of the comparative embodiments, the thicknesses of each inner peripheral magnet and each outer peripheral magnet are 3 [mm].

In the valve unit of the comparative example, when the rotation angle of the valve element 30 detected by the magnetic sensor 68 is around ±15 [°], the rotation angle of the valve element 30 is not steady. This may be a sign that resonance of the valve element 30 in the rotation direction is about to occur. Further, when the rotation angle of the valve element 30 detected by the magnetic sensor 68 is around −25 [°], the rotation angle of the valve element 30 significantly varies, that is, the valve element 30 resonates in the rotation direction. The rotation angle of the valve element 30 cannot be maintained. If the motor 50 is a stepping motor, the stepping motor may lose steps and may not perform the control.

Figure 8:
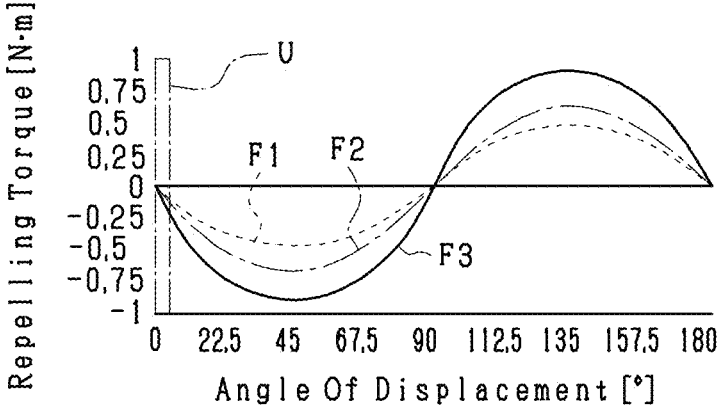
FIG. 8 is a chart illustrating results of simulation for exhibiting effects of thickness of magnets and outer diameter of outer peripheral magnets on repelling torque relative to angle of displacement of the magnet coupling.

FIG. 8 illustrates simulation results that exhibit the influence of the magnet thickness and the outer diameter defined by the outer peripheral magnets on a repelling torque with respect to displacement in angle of the magnet coupling. The displacement in angle is a difference in angle between the outer peripheral magnet 62 and the inner peripheral magnet 66 that is shifted from a state in which the S pole of the inner peripheral magnet 66 is positioned opposite the N pole of the outer peripheral magnet 62. When the repelling torque generated by the magnet coupling is negative, torque is generated in a direction that prohibits the rotation caused by an external torque. When the repelling torque is positive, torque is generated in a direction that promotes the rotation caused by the external torque. Frame U indicated by a dashed-dotted line illustrates a range of displacement in angle between the outer peripheral magnet and the inner peripheral magnet. If a displacement is in the range, it is determined that resonance of the valve element 30 is not occurring. If a displacement is over the range, it is determined that the resonance of the valve element 30 may be about to occur or occurring. To reduce the resonance of the valve element 30, it is effective to increase the magnitude of the repelling torque in the range represented by frame U and to increase the natural frequency of the magnet coupling. That is, the increase in magnitude of repelling torque per unit displacement by rotation (the increase in repelling torque with respect to the displacement by rotation) is more important than a peak value of the repelling torque.

A dashed line curve F1 illustrates repelling torque of the magnet coupling of the comparative embodiments illustrated in FIG. 7. A dashed-dotted line curve F2 illustrates repelling torque when the outer peripheral magnet in the magnet coupling in the comparative example is increased toward the center such that the thickness increases from 3 [mm] to 5 [mm] and the outer diameter of the inner peripheral magnet is reduced by an amount corresponding to the increase in thickness of the outer peripheral magnet. A solid line curve F3 illustrates repelling torque when the outer diameter of the outer peripheral magnets of the magnet coupling in the comparative example is increased from 47 [mm] to 55 [mm] (the distance between the central axis 22c of the valve chamber 22 and the outer peripheral surface of the outer peripheral magnets is increased from 23.5 [mm] to 27.5 [mm]) and the outer diameter of the inner peripheral magnets is increased in accordance with the increase in outer diameter of the outer peripheral magnets. The results exhibit that the increase of the outer peripheral magnets to the inner diameter side and the increase of the outer diameter of the outer peripheral magnets are effective for increasing the magnitude of the repelling torque in the range of frame U. To increase the magnitude of the repelling torque in the range of frame U, increasing of the outer diameter of the outer peripheral magnet is more effective than increasing of the thickness of the outer peripheral magnet to the inner diameter side.

Figure 9:
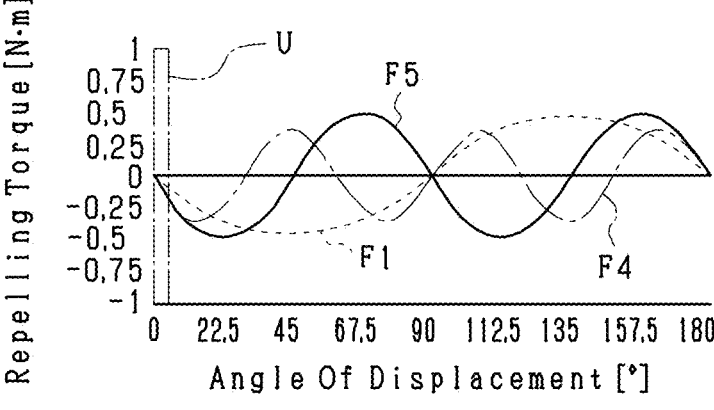
FIG. 9 is a chart illustrating simulation results that exhibit variations of repelling torque relative to the angle of displacement the magnet coupling according to the number of magnets.

FIG. 9 illustrates simulation results that exhibit variations of repelling torque relative to the angle of displacement the magnet coupling according to the number of magnets.

A broken line curve F1 represents the repelling torque of the magnet coupling in the comparative example. A dashed-dotted line curve F4 represents the repelling torque when the number of the outer peripheral magnets and the number of the inner peripheral magnets of the magnet coupling in the comparative example are increased from 4 to 12. A solid line curve F5 represents the repelling torque when the number of the outer peripheral magnets and the number of the inner peripheral magnets of the magnet coupling in the comparative example are increased from 4 to 8. The results show that the increase in repelling torque per unit displacement by rotation is larger within the range indicated by frame U when the number of the outer peripheral magnet and the number of the inner peripheral magnet are increased. However, in the range indicated by frame U, the repelling torques are not different from each other between the configuration that includes 12 magnets and the configuration that includes 8 magnets. Therefore, the increase in number of the outer peripheral magnets and the inner peripheral magnets to eight is more effective for increasing the repelling torque within the range indicated by frame U with the minimum number of magnets.

When the thickness of the outer peripheral magnets and the thickness of the inner peripheral magnets are in a range from 2 to 4 [mm] (i.e., between 2 [mm] and 4 [mm]), the simulation results are similar to the results when the thickness of the outer peripheral magnets and the thickness of the inner peripheral magnets are 3 [mm]. Further, even when the thickness of the outer peripheral magnets and the thickness of the inner peripheral magnets are out of the range from 2 to 4 [mm], similar results were obtained. When the outer diameter of the outer peripheral magnets is in a range from 50 to 60 [mm], namely, between 50 [mm] and 60 [mm] (the distance between the central axis 22*c* of the valve chamber 22 and the outer peripheral surface of the outer peripheral magnets is 25 to 30 [mm]), the simulation results are similar to the results when the outer diameter of the outer peripheral magnets is 47 [mm]. Further, even when the outer diameter of the outer peripheral magnets is out of the range from 50 to 60 [mm], similar results were obtained.

Figure 10:
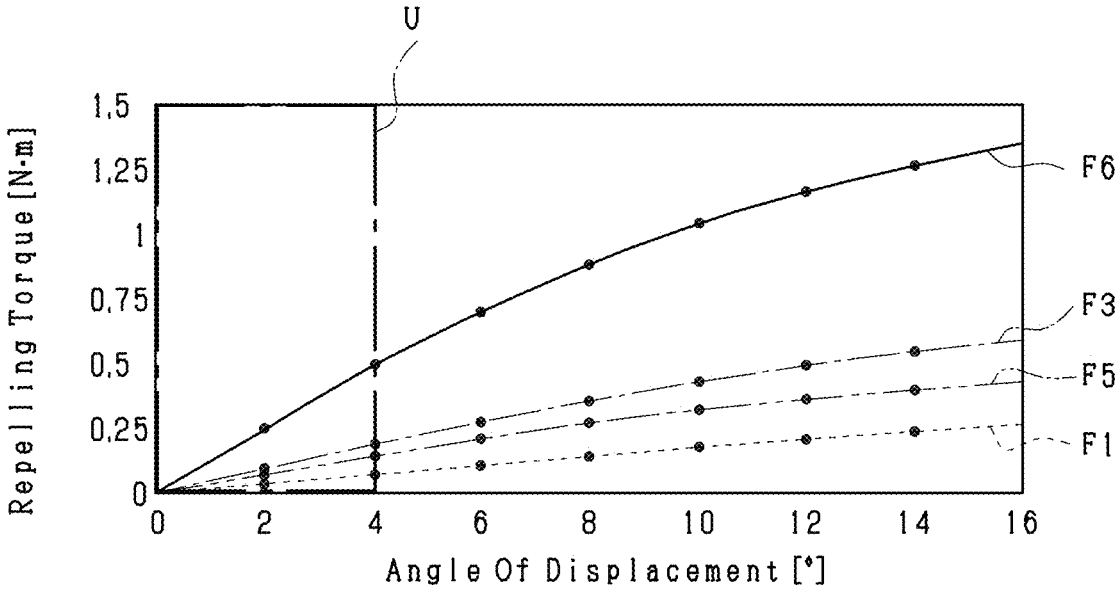
FIG. 10 is a chart illustrating results of simulation for exhibiting relationship between the repelling torque and the outer diameter of the outer peripheral magnets and the number of magnets relative to the angle of displacement of the magnet coupling.

FIG. 10 illustrates simulation results that exhibit the relationship among the repelling torque with respect to the angular displacement of the magnet coupling, the outer diameter of the outer peripheral magnet, and the number of magnets. With respect to the angular displacement in the range indicated by frame U and therearound, the repelling torque in the direction of preventing the rotation with respect to the torque from the outside is indicated by a positive value.

A broken line curve F1 represents the repelling torque of the magnet coupling in the comparative example. A two-dot chain line curve F5 represents the repelling torque when the number of the outer peripheral magnets and the number of the inner peripheral magnets of the magnet coupling in the comparative example are increased from 4 to 8. A dashed-dotted line curve F3 represents the repelling torque when the outer diameter of the outer peripheral magnets of the magnet coupling in the comparative example is increased from 47 [mm] to 55 [mm] and the outer diameter of the inner peripheral magnet is increased in accordance with the increase in outer diameter of the outer peripheral magnets. A solid line curve F6 represents the repelling torque when the number of the outer peripheral magnets and the number of the inner peripheral magnets of the magnet coupling in the comparative example are increased from 4 to 8, the outer diameter of the outer peripheral magnets is increased from 47 [mm] to 55 [mm], and the outer diameter of the inner peripheral magnets is increased in accordance with the increase in outer diameter of the outer peripheral magnets, that is, the repelling torque of the first magnet coupling 60A in one or more embodiments. Therefore, the number of the outer peripheral magnet and the inner peripheral magnet is increased from 4 to 8, and the outer diameter of the outer peripheral magnet is increased from 47 [mm] to 55 [mm], by increasing the outer diameter of the inner peripheral magnet accordingly, it is possible to dramatically increase the repelling torque.

The simulation results when the thickness of the outer peripheral magnets and the thickness of the inner peripheral magnets are in a range from 2 to 4 [mm], namely, between 2 [mm] and 4 [mm], are similar to the results when the thickness of the outer peripheral magnets and the thickness of the inner peripheral magnets are 3 [mm]. Further, even when the thickness of the outer peripheral magnets and the thickness of the inner peripheral magnets are out of the range from 2 to 4 [mm], similar results were obtained.

Figure 11:
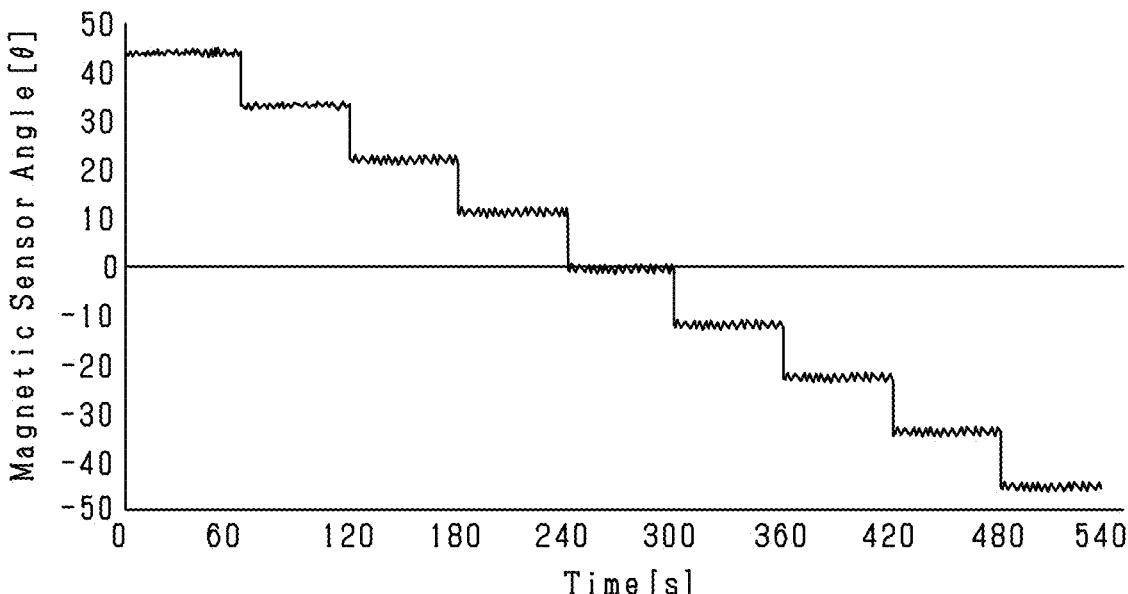
FIG. 11 is a time chart illustrating control state of the valve unit in one or more embodiments.

FIG. 11 illustrates control of the valve unit in one or more embodiments. The rotation angle of the valve element 30 detected by the magnetic sensor 68 when the rotation angle of the valve element 30 is altered and held in a stepwise manner is shown. In the valve unit 10 according to one or more embodiments, the valve element 30 does not resonate in the rotation direction and no indication or the resonance of the valve element 30 in the rotation direction is observed in the entire use range in which the rotation angle of the valve element 30 detected by the magnetic sensor 68 is in a range from 45 [°] to −45 [°], namely, between 45 [°] and −45 [°].

The embodiments described in detail above have the following advantages.

The first four-way valve 20A has the predetermined clearance A between the inner surface 21*f* of the main body 21 and the valve element 30. This may reduce (or lower) the sealing performance to keep the fluid inside. Therefore, the sliding resistance between the inner surface 21*f* of the main body 21 and the valve element 30 can be significantly reduced. This improves the rotational response and the rotational position accuracy of the valve element 30.

The first magnet coupling 60A includes eight outer peripheral magnets 62 and eight inner peripheral magnets 66. The outer peripheral magnets 62 have the arc shape with the central axis 22 as the center and have the N poles and S poles on the outer peripheral side and the inner peripheral side. The outer peripheral magnets 62 are arranged such that the magnetic poles are disposed alternately in the circumferential direction. The inner peripheral magnets 66 have the arc shape with the central axis 22 as the center and have the N poles and S poles on the outer peripheral side and the inner peripheral side. The outer peripheral magnets 62 are opposite the outer peripheral magnets 62 and arranged such that the magnetic poles are disposed alternately in the circumferential direction. In the first magnet coupling 60A that includes eight outer peripheral magnets 62 and eight inner peripheral magnets 66, the increase in repelling force with respect to the displacement between the inner peripheral magnets and the outer peripheral magnets in the rotational direction can be increased at the rising edge, and the maximum magnitude of the repelling force can be increased in comparison to the configuration in which the first magnet coupling 60A include four outer peripheral magnets and four inner peripheral magnets. This has been confirmed through the simulations. In the first magnet coupling 60A that includes 12 outer peripheral magnets and 12 inner peripheral magnets, the increase in repelling force with respect to the displacement between the inner peripheral magnets and the outer peripheral magnets in the rotational direction can be increased at the rising edge; however, the maximum magnitude of the repelling force is small in comparison to the first magnet coupling 60A that includes four outer peripheral magnets and four inner peripheral magnets. This has been confirmed through the simulations.

The distance between the central axis 22c and the outer peripheral surface 62f of the eight outer peripheral magnets 62 is 90[%] or more of the distance L1 between the central axis 22c and the closest outer surface 21s of the main body 21 in the direction perpendicular to the central axis 22c. The greater the distance between the central axis 22c and the outer peripheral surface of the outer peripheral magnets is, the greater the increase in repelling force with respect to the displacement between the inner peripheral magnets and the outer peripheral magnets in the rotational direction and the maximum magnitude of the repelling force are. This has been confirmed through the simulations. In comparison to the configuration in which the distance between the central axis 22c and the outer peripheral surface 62f of the eight outer peripheral magnets 62 is less than 90[%] of the distance between the central axis 22c and the closest outer surface 21s of the main body 21 with respect to the central axis 22c in the direction perpendicular to the central axis 22c, the magnetic force that acts on the inner peripheral magnet 66 from the outer peripheral magnet 62 can be increased.

Therefore, the repelling force generated by the first magnet coupling 60A can be increased and thus the natural frequency of the first magnet coupling 60A can be increased greater than the frequency of the pulsation of the fluid. Even in the configuration that has the predetermined clearance A between the inner surface 21f of the main body 21 and the valve element 30, which may reduce the sealing performance to keep the fluid inside, the resonance of the valve element 30 in the rotational direction can be reduced. Further, the distance between the central axis 22c and the outer peripheral surface 62f of the eight outer peripheral magnets 62 is 100[%] or less of the distance L1 between the central axis 22c and the closest outer surface 21s of the main body 21 to the central axis 22c in the direction perpendicular to the central axis 22c. Therefore, the outer peripheral surface 62f of the outer peripheral magnets 62 is less likely to protrude outward farther than the outer surface 21s of the main body 21 with respect to the central axis 22c of the valve chamber 22.

The closest outer peripheral surface 62f of the outer peripheral magnets 62 to the outer surface 21s of the main body 21 is only 5 [mm] or less inward from the closest outer surface 21s of the main body 21 to the central axis 22c. According to the configuration, the outer peripheral surface 62f of the outer peripheral magnets 62 is less likely to protrude outward farther than the outer surface 21s of the main body 21 with respect to the central axis 22c of the valve chamber 22, and the magnetic force that acts on the inner peripheral magnets 66 from the outer peripheral magnet 62 can be increased as much as possible.

The main body 21 is formed in a regular quadrangular prism shape that extends in the direction in which the central axis 22c extends. The distance L1 between the central axis 22c and the closest outer surface 21s of the main body 21 to the central axis 22c is 30 [mm]. The cross section of the main body 21 of the first four-way valve 20A (a cross section that is perpendicular to the central axis 22c of the valve chamber 22) is in a square shape. The length of each side of the main body 21 is 60 [mm]. According to the configuration that includes the main body 21 of the first four-way valve 20A formed in a 60 millimeter square quadrangular prism shape, which is a general shape in a general size, and the resonance of the valve element 30 in the rotational direction can be reduced.

The distance between the central axis 22c and the outer peripheral surface 62f of eight outer peripheral magnets 62 is 27.5 [mm]. That is, the outer diameter of the cylindrical magnet defined by eight outer peripheral magnets 62 that are arranged in the circumferential direction is 55 [mm]. According to the configuration, the outer diameter (55 [mm]) of the cylindrical magnet defined by eight outer peripheral magnets 62 is 91.67[%] of the width (60 [mm]) of the regular quadrangular prism-shaped main body 21. That is, the repelling torque can be dramatically increased within the region indicated by frame U as illustrated in FIG. 10.

The thicknesses of the eight outer peripheral magnets 62 and the eight inner peripheral magnets 66 measuring in the radial direction are 3 [mm]. According to the configuration, the thicknesses of the outer peripheral magnets 62 and the inner peripheral magnets 66 measuring in the radial direction are less likely to be greater than necessary.

The fluid is the liquid. In the valve unit 10 that receives influence of cavitation in which the liquid is vaporized due to a low pressure and bubbles are generated, that is, in which resonance of the valve element 30 is more likely to occur, the resonance of the valve element 30 in the rotation direction can be reduced.

The first magnet coupling 60A transmits the torque between the valve element 30 in the first four-way valve 20A and the motor 50 without contact. Therefore, the valve element 30 in the first four-way valve 20A is easily rotatable while being sealed and the heat transfer is less likely to occur between the valve element 30 and the motor 50 in the first four-way valve 20A. Similarly, the second magnet coupling 60B transmits torque between the valve element 30 in the second four-way valve 20B and the motor 50 without contact. Therefore, the valve element 30 in the second four-way valve 20B is easily rotatable while being sealed and the heat transfer is less likely to occur between the valve element 30 and the motor 50 in the second four-way valve 20B. Even when the temperature of the fluid, the flow of which is controlled by the first four-way valve 20A differs from the temperature of the fluid, the flow of which is controlled by the second four-way valve 20B, the heat is less likely to be transferred between the valve element 30 of the first four-way valve 20A and the valve element 30 in the second four-way valve 20B via the motor 50.

The embodiments can be modified as follows. The same parts as those in the embodiments are denoted by the same reference signs, and will not be described.

Figure 12:
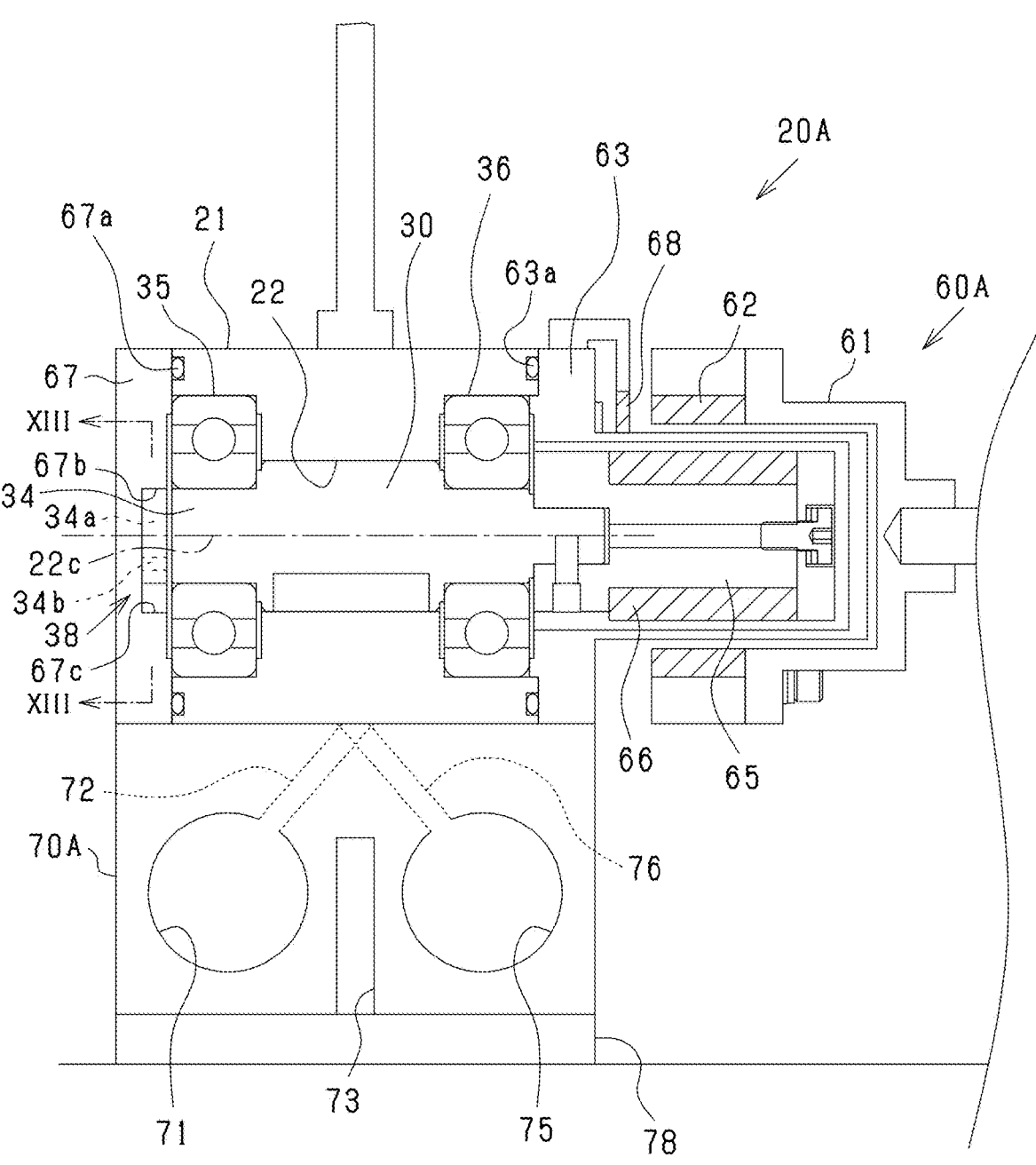
FIG. 12 is a partial cross-sectional view of a modification of the four-way valve.
Figure 13:
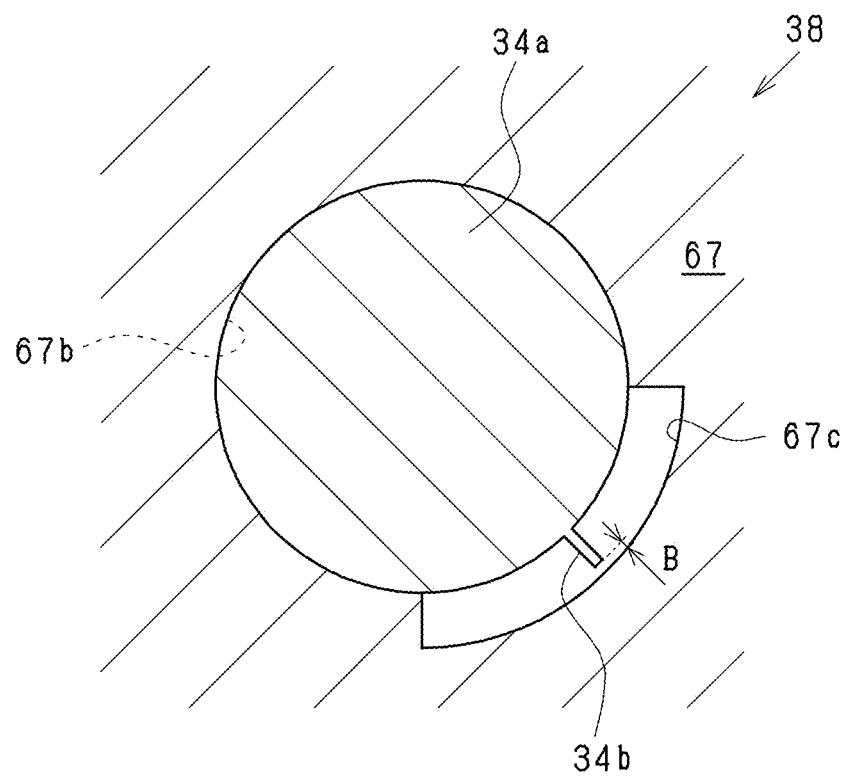
FIG. 13 is a cross-sectional view taken along line XIII-XIII in FIG. 12.

As illustrated in FIGS. 12 and 13, the first four-way valve 20A (the valve unit 10) may include a damper 38 (a shock absorber) that reduces resonances of the valve element 30 in the rotational direction. The damper 38 may include an extending portion 34a, a recess 67b, a projection 34b, and an arc-shaped recess 67c. The extending portion 34a is formed by extending a central portion 34 of the valve element 30. The recess 67b is formed in the cover 67. The projection 34b is included in the extending portion 34a. The arc-shaped recess 67c is formed in the cover 67. The extending portion 34a is a portion in which the central portion 34 of the valve element 30 extends toward the cover 67 in the central axis 22c, and is formed in a cylindrical shape. The recess 67b holds the extending portion 34a therein. The recess 67b is formed in a shape with a circular cross section. An inner peripheral surface of the recess 67*b* and an outer peripheral surface of the extending portion 34*a* are adjacent to each other such that the fluid controlled by the first four-way valve 20A does not substantially flow (does not flow or is difficult to flow). The projection 34*b* is formed in a blade shape (a plate shape). The projection 34*b* protrudes from the extending portion 34*a* in the radial direction for a predetermined length. The arc-shaped recess 67*c* is formed in an arc shape with the central axis 22*c* as a center and along the outer periphery of the extending portion 34*a*. A projection 34*b* is disposed inside the recess 67*c*. A predetermined clearance B is formed between the distal end of the projection 34*b* and the inner surface of the recess 67*c*. The inside of the recess 67*c* is filled with a fluid, the flow of which is controlled by the first four-way valve 20A.

According to the configuration, the projection 34*b* rotates with the extending portion 34*a* when the valve element 30 rotates. Therefore, the fluid in the recess 67*c* is pushed by the projection 34*b* to flow. Since the fluid is less likely to flow between the inner peripheral surface of the recess 67*b* and the outer peripheral surface of the extending portion 34*a*, the fluid in the recess 67*c* flows only through the clearance B. A resistance is applied to the rotation of the valve element 30. The resistance increases as the rotation speed of the valve element 30 increases. The damper 38 can impart a large resistance to the valve element 30 that resonates in the rotation direction and rotates at a high speed and thus the resonance of the valve element 30 can be reduced.

The main body 21 is not limited to a regular quadrangular prism shape (quadrangular prism shape), and may be formed in another regular polygonal prism shape (polygonal prism shape) or a cylindrical shape.

The valve element 30 in the first four-way valve 20A (the rotary valve) and the valve element 30 in the second four-way valve 20B (the rotary valve) can be rotated by separate motors with phases shifted by 90° (interlocked). The valve element 30 in the first four-way valve 20A and the valve element 30 in the second four-way valve 20B can be rotated independently by separate motors. Alternatively, the first four-way valve 20A or the second four-way valve 20B may be used alone.

The rotary valve included in the valve unit 10 is not limited to a four-way valve, and may be a three-way valve or other types of valves. Even in such a configuration, by adopting the first magnet coupling 60A to the rotary valve that has the predetermined clearance A between the inner surface 21*f* of the main body 21 and the valve element, the resonance of the valve element can be reduced.

The valve element in the rotary valve is not limited to the configuration that includes the cylindrical central portion and the partition portions that have the plate shape and extend from the central portion in the radial direction of the valve chamber 22. The valve element may include a fluid flow channel that is formed inside the cylindrical valve element. Even in such a configuration, by adopting the first magnet coupling 60A to the rotary valve that has the predetermined clearance A between the inner surface 21*f* of the main body 21 and the valve element, the resonance of the valve element can be reduced.

The fluid is not limited to a fluorine-based inert liquid, and may be alcohol, water, oil, or other kinds of liquids. The fluid is not limited to a liquid, and a gas may be used.

A transmission mechanism (e.g., a gear mechanism) that accelerates or decelerates the rotational speed of the motor 50 may be connected between the motor 50 and the first magnet coupling 60A and the second magnet coupling 60B.

The embodiments and modifications of the embodiments may be combined and implemented within a reasonable extent. The present disclosure has been described in conformity with examples but is not limited to the examples and the structures therein. The present disclosure encompasses a variety of variation examples and variations in the scope of equivalents of the present disclosure. In addition, a variety of combinations and forms and even other combinations and forms to which only one element or two or more elements are added fall within the scope and ideological range of the present disclosure.

What is claimed is:

1. A valve unit comprising:
   a rotary valve comprising:
      a main body comprising a cylindrical valve chamber; and
      a valve element, housed in the valve chamber and rotatable about a central axis of the valve chamber, that controls flow of a fluid that flows into the valve chamber according to a rotational position of the valve element;
   a motor comprising a rotary shaft that rotates and is held at a predetermined rotary position; and
   a magnet coupling that transmits a torque between the rotary shaft and the valve element, wherein
   the rotary valve has a predetermined clearance between an inner surface of the main body and the valve element,
   the magnet coupling comprises:
      eight outer peripheral magnets having N-poles and S-poles, wherein each of the N-poles and S-poles is disposed on an outer peripheral side or an inner peripheral side, and
      eight inner peripheral magnets having N-poles and S-poles, wherein each of the N-poles and S-poles is disposed on an outer peripheral side or an inner peripheral side,
   the outer peripheral magnets are disposed in a circle about the central axis such that the N-poles and the S-poles are disposed alternately in a circumferential direction and such that a distance between the central axis and an outer peripheral surface of the outer peripheral magnets is between 90% and 100% of a distance between the central axis and an outer surface of the main body closest to the central axis in a direction perpendicular to the central axis,
   the inner peripheral magnets are disposed in a circle about the central axis and opposite to the outer peripheral magnets such that the N-poles and the S-poles are disposed alternately in the circumferential direction, and
   the outer peripheral magnets and inner peripheral magnets are disposed such that the N-poles of the inner peripheral magnets are opposite to the S-poles of the outer peripheral magnets and the S-poles of the inner peripheral magnets are opposite to the N-poles of the outer peripheral magnets, respectively.

2. The valve unit according to claim 1, wherein the outer surface of the outer peripheral magnets closest to the outer surface of the main body is at a position within 5 mm apart from the outer surface of the main body closest to the central axis.

3. The valve unit according to claim 1, wherein
   the main body has a regular quadrangular prism shape that extends in an extending direction of the central axis, and
   the distance between the central axis and the outer surface of the main body closest to the central axis is 30 mm.

4. The valve unit according to claim 3, wherein a distance between the central axis and the outer peripheral surface of each of the outer peripheral magnets is 27.5 mm.

5. The valve unit according to claim 4, wherein a thickness of the outer peripheral magnets and a thickness of the inner peripheral magnets measured in a radial direction are 3 mm.

6. The valve unit according to claim 1, wherein the fluid is a liquid.

7. The valve unit according to claim 1, wherein the N-poles and the S-poles of the outer peripheral magnets and the N-poles and the S-poles of the inner peripheral magnets are disposed alternately in a radial direction from the central axis toward outside.

8. A valve unit comprising:

a rotary valve comprising:

a main body comprising a cylindrical valve chamber; and a valve element being housed in the valve chamber and having a predetermined clearance between an inner surface of the main body and the valve element, wherein the valve element extends along a central axis of the valve chamber to rotate about the central axis of the valve chamber in a rotation angle range between +45° and −45° relative to a neutral position, and the valve element includes:

a central portion in a columnar shape that has a central axis aligned with the central axis of the valve chamber; and a first divider, a second divider, and a third divider that protrude from the central portion in a radial direction of the valve chamber and divide the valve chamber into regions, wherein each of the first divider, the second divider, and the third divider has a flat plate shape, wherein the valve element is held at different rotation angles in the rotation angle range to hold the first divider, the second divider, and the third divider at different positions to control flow of a fluid that flows into the valve chamber;

a motor comprising a rotary shaft that rotates about the central axis of the valve chamber, wherein the rotary shaft is held at rotation positions to hold the valve element at rotation angles in the rotation angle range; and a magnet coupling that is disposed between the rotary valve and the motor to transmit a torque between the rotary shaft and the valve element without contact, wherein the rotary valve has a predetermined clearance between an inner surface of the main body and the valve element, the magnet coupling comprises:

an outer peripheral component in a cylindrical shape with a closed bottom that is coupled to an end of the rotary shaft to rotate with the rotary shaft, wherein the outer peripheral component is separated from the main body;

an inner peripheral component in a round shape with a diameter less than an inner diameter of the outer peripheral component, wherein the inner peripheral component is disposed inside the outer peripheral component without contact and is coupled to an end of the central portion of the valve element;

four first outer peripheral magnets, each of which includes an N-pole on an outer peripheral side and an S-pole on an inner peripheral side;

four second outer peripheral magnets, each of which includes an N-pole on the inner peripheral side and an S-pole on the outer peripheral side;

four first inner peripheral magnets, each of which includes an N-pole on an outer peripheral side and an S-pole on an inner peripheral side; and four second inner peripheral magnets, each of which includes an N-pole on the inner peripheral side and an S-pole on the outer peripheral side, the first outer peripheral magnets and the second outer peripheral magnets are alternately disposed on an inner periphery of the outer peripheral component, the first inner peripheral magnets and the second inner peripheral magnets are alternately disposed on the outer periphery of the inner peripheral component, the first inner peripheral magnets are opposite to the first outer peripheral magnets in the radial direction of the valve chamber, and the second inner peripheral magnets are opposite to the second outer peripheral magnets in the radial direction of the valve chamber.

\* \* \* \* \*